US005552451A

United States Patent [19]

Everaerts et al.

[11] Patent Number: 5,552,451
[45] Date of Patent: Sep. 3, 1996

[54] REMOVABLE, LOW MELT VISCOSITY ACRYLIC PRESSURE SENSITIVE ADHESIVES

[75] Inventors: Albert I. Everaerts, Oakdale; Jeffrey D. Malmer, North St. Paul, both of Minn.

[73] Assignee: Minnesota Mining and Manufacturing Company, St. Paul, Minn.

[21] Appl. No.: 334,807

[22] Filed: Nov. 4, 1994

Related U.S. Application Data

[63] Continuation of Ser. No. 218,841, Mar. 28, 1994, abandoned, which is a continuation of Ser. No. 816,593, Dec. 31, 1991, abandoned.

[51] Int. Cl.$^6$ ....................................................... C08F 2/46
[52] U.S. Cl. ........................... 522/46; 522/181; 522/182; 427/457
[58] Field of Search ......................... 522/46, 181, 182; 427/457

[56] References Cited

U.S. PATENT DOCUMENTS

| | | | |
|---|---|---|---|
| 3,008,850 | 11/1961 | Ulrich | 117/122 |
| 3,635,754 | 1/1972 | Beede | 117/122 |
| 3,691,140 | 9/1972 | Silver | 260/78.5 |
| 3,707,518 | 12/1972 | Bemmels et al. | 260/29.6 |
| 3,900,674 | 8/1975 | Coffman | 428/355 |
| 3,983,297 | 9/1976 | Ono et al. | 428/355 |
| 4,038,454 | 7/1977 | Lehmann et al. | 428/356 |
| 4,201,808 | 5/1980 | Cully | 522/99 |
| 4,379,201 | 4/1983 | Heilmann | 522/182 |
| 4,554,324 | 11/1985 | Husman et al. | 525/301 |
| 4,599,265 | 7/1986 | Esmay | 428/355 |
| 4,737,559 | 4/1988 | Kellen et al. | 526/291 |
| 5,045,569 | 9/1991 | Delgado | 521/60 |
| 5,073,611 | 12/1991 | Rehmer | 522/36 |
| 5,156,911 | 10/1992 | Stewart | 428/355 |

FOREIGN PATENT DOCUMENTS

| | | |
|---|---|---|
| 0109177 | 5/1984 | European Pat. Off. . |
| 308203 | 3/1989 | European Pat. Off. . |
| 3935097 | 4/1991 | Germany . |
| 2256815 | 12/1992 | United Kingdom . |
| WO90/13420 | 11/1990 | WIPO . |
| WO91/18739 | 12/1991 | WIPO . |

OTHER PUBLICATIONS

International Search Report PCT/US92/11156.
International Search Report PCT/US92/10776.

*Primary Examiner*—Mark Chapman
*Attorney, Agent, or Firm*—Gary L. Griswold; Walter N. Kirn; David B. Bernstein

[57] ABSTRACT

The present invention relates to a permanently removable, low melt viscosity acrylic pressure-sensitive adhesive comprising a lower alkylacrylate, a higher alkylacrylate and a crosslinker.

20 Claims, No Drawings

REMOVABLE, LOW MELT VISCOSITY ACRYLIC PRESSURE SENSITIVE ADHESIVES

This is a continuation of application Ser. No. 08/218,841 filed Mar. 28, 1994, now abandoned, which is a continuation of application Ser. No. 07/816,593 filed Dec. 31, 1991, now abandoned.

FIELD OF INVENTION

The present invention relates to a permanently removable, low melt viscosity acrylic pressure-sensitive adhesive. In particular, the present invention relates to an adhesive comprising a lower alkyl acrylate, a higher alkyl acrylate and a crosslinker.

BACKGROUND OF THE INVENTION

Removable pressure sensitive adhesives (PSA) adhered to a backing, which predictably adhere, yet remain repeatedly peelable from a variety of substrates over a long period of time without damaging or marring the substrate, have many commercial uses. For example, masking tapes, removable labels or office notes, protective films and medical tapes all must quickly adhere to metal, paper, plastics and skin, respectively, but must also peel smoothly away from these varied substrates without leaving behind any adhesive residue on or damaging the surface of a particular substrate.

Ideally, depending on the substrate, the removable adhesive must provide sufficient tack (or quick stick) to quickly fix the adhesive to the desired substrate, adequate peel strength to prevent damage of the surface when the adhesive is removed, and have the appropriate cohesive strength to control the transfer of adhesive to the substrate. Cohesive strength must also be controlled so to limit the cold flow of the adhesive on a surface, a process which leads to an undesirable building of peel strength over time. Balancing these pressure sensitive adhesive properties, particularly in a removable adhesive, poses difficulties to the formulator.

U.S. Pat. No. 3,691,140 (Silver) discloses the use of solid, inherently tacky, pressure-sensitive adhesive microspheres which, when adhered to a first substrate, may when contacted to a second substrate be easily removed from the second substrate without delaminating the first substrate or the second substrate. While exhibiting a high degree of removability, microsphere adhesives tend to transfer to contact surfaces such the second substrate.

U.S. Pat. No. 5,045,569 (Delgado) discloses hollow, inherently tacky pressure-sensitive adhesive acrylate microspheres which, due to their unique morphology, provide enhanced peel and shear strength and less adhesive transfer to substrates than "repositionable" adhesives based on solid acrylate-based microspheres. Although hollow microsphere adhesives show less adhesive transfer to substrates, they still have less than an optimum degree of adhesive transfer.

In contrast, U.S. Pat. No. 4,599,265 (Esmay) discloses an adhesive having a high degree of cohesive strength. The adhesive disclosed is an acrylate, has low tack and maintains peelability from a variety of ordinary substrates. Esmay teaches that through the crosslinking of the tape's adhesive layer and the use of low levels of polar monomer (up to mole 3% of a strongly polar monomer, such as acrylic acid) along with alkyl acrylates having side chains 4–12 carbons in length in the copolymeric adhesive, the required balance of low tack and high cohesive strength can be imparted to the removable adhesive. One drawback associated with the Esmay adhesive is excessive adhesive bleeding of monomers through a substrate such as paper prior to curing. Such bleeding is undesirable because of the damage done to the substrate.

U.S. Pat. No. 4,737,559 (Kellen et al.) describes another method of crosslinking an adhesive. Kellen et al. teaches the use of a PSA formulation in which the viscous flow, and resultant adhesion buildup, is controlled through the addition of small amount of a free radically polymerizable photocrosslinker (a mono-ethylenically unsaturated aromatic ketone, most preferably 4-acryloyloxy-benzophenone) to at least one alkyl acrylate or methacrylate. The Kellen et al. adhesive is formulated for adhesion to skin.

U.S. Pat. No. 3,635,754 (Beede) discloses the use of a heat-activated, multi-phase pressure-sensitive adhesive copolymer whose melting point is greater than 35° C. and whose glass transition temperature ($T_g$) is below 5° C. At room temperature, the adhesive is non-tacky. At that temperature, a crystalline or ordered phase and an amorphous or disordered phase co-exist. At skin temperature (approximately 35° C.), the copolymer becomes amorphous and the adhesive is tacky. This phenomenon may be reversed by cooling the adhesive for removal from a substrate, with the crystallization of the side chains providing sufficient cohesive strength to prevent any transfer of adhesive to the substrate.

PCT PUBLICATION NO. WO90/13420 (Stewart et al.) discloses a temperature activated, pressure-sensitive adhesive which is rapidly converted from non-tacky to tacky over a predetermined temperature range. Similar to the multiphase adhesive of Beede, this temperature dependent adhesive relies on the careful selection of side chain crystallizable monomers, particularly those monomers which have linear aliphatic side chains of at least 10 carbon atoms, including $C_{14}$-$C_{22}$ alkyl acrylates or methacrylates. Stewart et al. specify that these compositions, when a mixture of copolymerizable monomers are used, must contain at least 50% by weight monomers with crystallizable side chains. However, at room temperature, these adhesives are substantially non-tacky.

In using PSAs, it is also desirable to combine these removable qualities with the procedural, economical and environmental advantages of a hot melt processable adhesive. To date, most attempts to prepare acrylic hot melt PSAs have been limited because such materials have poor cohesive strength at room temperature or are too viscous even for use at high temperatures found in current melt processing equipment and practices. Maintaining sufficient cohesive strength, as noted above, is one critical factor in the formulation of permanently removable PSAs.

Typically, the cohesive strength of acrylic polymeric PSAs, which are not microspheres, may be improved in a variety of ways, but each way has its disadvantages, especially when the formulator wishes to maintain a low melt viscosity for the PSA. The molecular weight of the acrylic polymer may be raised to improve cohesive strength, but an unavoidable and unacceptable rise in melt viscosity also results. Polar monomer content, such as acrylic acid, may also be increased to improve cohesive strength, a property which is useful in many adhesive applications. However, increased polar monomer content also causes greater adhesion buildup, as described by U.S. Pat. No. 3,008,850 (Ulrich). Finally, cohesive strength may be enhanced through the covalent crosslinking of the adhesive. Covalent crosslinking, though providing the needed increase in cohesive strength, eliminates the potential for melt processing.

Physical crosslinking is described in U.S. Pat. No. 4,554,324 (Husman et al.). Husman et al. disclose a hot melt processible acrylate PSA which gains the needed balance of cohesive strength, high tack, and low melt viscosity through the chemical modification of the soft acrylate backbone by grafting reinforcing high $T_g$ polymeric moieties to the acrylate chain. These high $T_g$ moieties provide glassy domains which enhance the cohesive strength of the adhesive at lower temperatures without dramatically increasing the melt viscosity of the composition. The peel adhesion strengths of the exemplified compounds, however, tend to exceed those values which are required for removability from most substrates.

Thus, there currently exists a need for a permanently removable acrylic pressure sensitive adhesive which displays a superior balance of tack, peel strength and cohesive strength which may be formulated for removal from a variety of substrates without damaging or depositing adhesive residue on the substate and without building excessively in adhesion over time.

SUMMARY OF THE INVENTION

Unless otherwise noted, the term "acrylate" is intended to refer to methacrylates in addition to acrylates.

The permanently removable, acrylic pressure-sensitive adhesive of the invention comprises:

a) from about 10 to about 50% by weight of at least one higher alkyl acrylate having an alkyl group from 12 to 26 carbon atoms;

b) from about 50 to about 90% by weight of at least one lower alkyl acrylate having an alkyl group from 4 to 12 atoms wherein said upper and lower alkyl acrylates cannot simultaneously have alkyl chains of 12 carbon atoms; and c) sufficient crosslinker to impart enough cohesive strength to the adhesive in order to prevent substantial adhesive transfer.

In one embodiment of the present invention, the lower alkyl acrylate has an alkyl group which is linear and has from 4 to 8 carbon atoms.

In another embodiment of the present invention, the lower alkyl acrylate has an alkyl group which is branched and has from 4 to 12 carbon atoms.

In a preferred embodiment of the present invention, the high alkyl acrylate has a carbon group which is branched and has from 13 to 26 carbon atoms.

This invention also provides for pressure-sensitive adhesive sheets coated with the permanently removable, acrylic adhesive composition.

Further, the present invention discloses methods of making adhesive coating sheets with the acrylic adhesive composition of the present invention.

DETAILED DESCRIPTION OF THE INVENTION

The permanently removable, low melt viscosity acrylic pressure-sensitive adhesive of the invention comprises three components: (1) at least one lower alkyl acrylate having an alkyl group which comprises from about 4 to 12 carbon atoms, (2) at least one higher alkyl acrylate having an alkyl group which comprises from about 12 to 26 carbon atoms and (3) sufficient crosslinker to impart cohesive strength to the adhesive.

The linear or branched lower alkyl acrylate or methacrylate esters useful in preparing the removable, low melt viscosity pressure sensitive adhesives of this invention are linear or branched monofunctional unsaturated acrylate or methacrylate esters of non-tertiary alkyl alcohols, the alkyl groups of which have from about 4 to about 12 carbon atoms. These lower linear and branched acrylates, as is well known in the pressure sensitive adhesive art, provide the properties of low glass transition temperature and viscoelastic characteristics that result in materials which are tacky in nature. Examples of the shorter chain, lower alkyl acrylates and methacrylates used in the invention include, but are not limited to, n-butyl acrylate, isobutyl acrylate, 2-ethylhexyl acrylate, isooctyl acrylate, n-octyl acrylate, n-octyl methacrylate, 2-methylbutyl acrylate, isononyl acrylate, isoamyl acrylate, isodecyl acrylate, isodecyl methacrylate, 4-methyl-2-pentyl acrylate, and mixtures thereof. Preferred lower acrylate and methacrylate esters of the invention include isooctyl acrylate, n-butyl acrylate, and 2-ethylhexyl acrylate.

The higher alkyl acrylate or methacrylate monomers useful in preparing the pressure sensitive adhesives of this invention are monofunctional unsaturated acrylate or methacrylate esters of non-tertiary alkyl alcohols, the alkyl groups of which have from about 12 to about 26 carbon atoms. Preferably, the alkyl groups have from about 13 to about 26 carbon atoms. The long side chains of these acrylate and methacrylate esters increase the entanglement molecular weight of the polymer and facilitate the melt processing of the polymer. At the concentrations used in this invention, no crystallization of the side chains occurs and the resulting polymers are amorphous. If substantial crystallization were present, the modulus of the material would increase and this increased modulus would cause a loss of pressure sensitive adhesive tack. The long alkyl chains of these acrylate and methacrylate esters also increase the non-polar character of the adhesive, thus reducing the specific inter-molecular interactions, such as hydrogen bonding, acid-base interaction, and the like, which lead to excessive adhesion build-up between the adhesives and substrates susceptible to such interactions.

Examples of the long side chain acrylate and methacrylate esters used in the present invention include, but are not limited to, lauryl acrylate, lauryl methacrylate, isotridecyl acrylate, n-tetradecyl acrylate, n-tetradecyl methacrylate, n-hexadecyl acrylate, n-hexadecyl methacrylate, n-octadecyl acrylate, n-octadecyl methacrylate, eicosanyl acrylate, hexacosanyl acrylate and mixtures thereof. Preferred long side chain alkyl acrylates and methacrylates include lauryl acrylate, lauryl methacrylate, octadecyl acrylate, octadecyl methacrylate, hexacosanyl acrylate, eicosanyl acrylate and isotridecyl acrylate.

Crosslinkers which enhance the cohesive strength of the removable pressure sensitive adhesive composition, include, but are not limited to: multifunctional acrylates and methacrylates; triazine-, benzophenone- and acetophenone-derived photocrosslinking compounds; and silanes.

Preferred crosslinkers are selected according to the processing method used in preparing the adhesives of this invention. For compositions which require no further melt processing following the initial polymerization, multifunctional acrylates and methacrylates, such as 1,4-butanediol diacrylate and 1,6-hexanediol diacrylate can be used as crosslinkers. Additional polyfunctional acrylic monomers which can be used as crosslinkers in the present invention are disclosed in U.S. Pat. No. 4,379,201 (Heilmann et al.), which is incorporated herein by reference.

Chromophore-substituted halomethyl-s-triazines, such as those described by U.S. Pat. Nos. 4,329,384 (Vesley et al.);

4,330,590 (Vesley); and 4,379,201 (Vesley), all of which are incorporated herein by reference, are also preferred crosslinking agents for compositions or applications which require no further melt processing or solvent casting.

Silanes can also be used as crosslinkers. Suitable silanes include trialkoxy silanes having mono-ethylenically unsaturated functionality. Other suitable silanes include silanes having dialkoxy or monoalkoxy substituted silane groups having mono-ethylenically unsaturated functionality.

Compositions of the invention which require further processing and undergo crosslinking by exposure to ultraviolet radiation following the initial polymerization may employ several preferred classes of crosslinkers including: chromophore-substituted halomethyl-s-triazines, such as those in the Vesley Patents described above, all of which are incorporated herein by reference; mono-ethylenically unsaturated aromatic ketones, particularly 4-acryloyl-oxy-benzophenone, as described by Kellen et al. in U.S. Pat. No. 4,737,559, which is incorporated herein by reference.

The pressure sensitive adhesive of this invention should comprise from about 10 to about 50% by weight of at least one linear or branched alkyl acrylate or methacrylate having from 12 to 26 carbon atoms; from about 50 to about 90% by weight of at least one linear lower alkyl acrylate ($C_4$-$C_8$) or branched lower alkyl acrylate ($C_4$-$C_{12}$); and sufficient crosslinker to impart cohesive strength to the adhesive. More preferably, the novel and unobvious pressure sensitive adhesive should comprise from about 30 to 50% by weight higher linear or branched alkyl acrylate or methacrylate esters having alkyl groups from 12 to 26 carbon atoms; from about 50 to about 70% by weight linear or branched lower acrylate or methacrylate having alkyl groups from about 4 to 12 carbon atoms and from about 0.05 to 1.0% and preferably, from about 0.1 to about 0.5% by weight crosslinker. The adhesive should have enough tack to adhere to a contact surface and have sufficient peel adhesion to allow a substrate coated with the adhesive to be easily removed from a contact surface.

The photoprocessible adhesives can be polymerized using any solution polymerization method. In the preferred method, the monomers along with the solvent and crosslinker are charged into a four-neck reaction vessel which is equipped with a stirrer, a thermometer, a condenser, addition funnel and a thermowatch. After the monomer is charged into the reaction vessel, a concentrated thermal initiator solution is added to the addition funnel. The whole reaction vessel and addition funnel with their contents are then purged with nitrogen to create an inert atmosphere. Once purged, the solution within the vessel is heated to about 55° C. and the initiator is added. A 98 to 99% percent conversion should be obtained after about 20 hours.

If the solution is then coated onto a substrate and no further processing is desired, the coating can be cured by exposure to ultraviolet light.

If the solution is not cast, but instead a hot melt coating is desired, the solvent is stripped. The solvent is stripped by applying the mixture onto a siliconized release liner which is then heated resulting in solvent evaporation. Thus, an adhesive product is left in solid form. The adhesive is then heated from about 145° C. to about 170° C. to reduce melt viscosity, coated onto a suitable substrate and then cured by exposure to an ultraviolet light source.

Another method of applying the adhesive of the present invention comprises UV prepolymerization of the monomer mixture to a syrup-like consistency, followed by the addition of a crosslinker. A suitable crosslinker is then added to a syrup-like mixture. Next, this syrup-like mixture is knife-coated onto a substrate and UV polymerized in an inert atmosphere to yield the finished adhesive coating.

The adhesive of the present invention can also be polymerized by charging the monomers with solvent, initiator and a silane crosslinker into a three-neck reaction vessel equipped with a stirrer, a thermometer, a thermowatch and condenser. After the monomer is charged into the reaction vessel, the whole reaction vessel with its contents is purged with nitrogen and heated to 55° C. After about 20 hours, a 97 to 98% percent conversion should be obtained. The material is then coated on a substrate and dried in an oven. Typically, a catalyst can be added to the solution prior to coating and oven drying. In the presence of moisture, a crosslinked adhesive is obtained and no further processing is required.

The removable PSA of the present invention depending upon its viscosity, can be coated via any of a variety of conventional coating methods, such as roll coating, knife coating, hot melt coating, or extrusion. The composition can be applied to at least a portion of at least one surface of suitable flexible or inflexible backing or sheet and cured to produce PSA-coated sheet materials. For example, it can be placed on a backing to form a tape. Or it can be applied to a sheet to form pressure sensitive sheets. For many purposes, it is preferred that the adhesive can be coated on both sides of a sheet. Those skilled in the art will recognize that novel adhesive can be applied to a variety of sheets and backings and can be simultaneously coated on both sides of the sheet or backing. Useful flexible backing materials include paper, plastic films such as poly(propylene), poly(ethylene), poly(vinyl chloride), poly(tetrafluoroethylene), polyester [e.g., poly(ethylene) terephthalate)], polyimide film such as DuPont's Kapton", cellulose acetate and ethyl cellulose. Backings can also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film or ceramic sheet material. PSA-coated sheet materials can take the form of any article conventionally known to be utilized with PSA compositions, such as labels, tapes, transfer tapes (comprising a film of the PSA borne on at least one release liner), signs, covers, marking indices, and the like. Primers can be utilized, but they are not always necessary.

TEST METHODS

Removability

Adhesives of the present invention are considered removable if they are removed cleanly from a test substrate without causing any damage to the test substrate over a range of peel rates and varied periods of dwell at room temperature.

A strip 0.127 dm in width of the sheet coated with the adhesive to be tested is applied to the horizontal surface of a polyester, treated polyester or paper test substrate with at least 1.27 lineal dm in firm contact. Three passes in each direction with a 2 kg hard rubber roller are used to apply the strip. If air bubbles are entrapped between the test substrate and the test strip, the sample is discarded. After one day or one week dwell, the free end of the coated strip is doubled back nearly touching itself so the angle of removal will be about 135°. The free end is then pulled by hand at a variety of peel rates. The removability and peel force are judged according to the following ratings and recorded:

good—samples that are removed from the test substrate without damaging or leaving residue on the test substrate and which also exhibit high peel force and yet does not damage the paper backing over a range of peel rates;

aggressive—samples that are removed from the test substrate without damaging or leaving residue on the test substrate, but which can only be removed from the test substrate at a slow peel rate without damaging the paper backing;

raspy—samples that are removed from the test substrate without damaging or leaving residue on the test substrate, but which are too stiff to be removed smoothly;

tear—samples that display too high a peel adhesion to the test substrate, causing test substrate and/or paper backing to tear or delaminate at any peel rate;

ghost—samples that leave a very thin, non-tacky adhesive residue on the test substrate when removed from the polyester and treated polyester samples; and weak—samples that have low tack and low peel.

cohesive failure—samples that leave adhesive residue on both the paper backing and the test substrate.

Peel Adhesion

Peel adhesion is the force required to remove a coated flexible sheet material from a test substrate measured at a specific angle and rate of removal. In the examples, this force is expressed in Newtons per decimeter (dm) width of coated sheet. The procedure followed is:

A strip 0.127 dm in width of the sheet coated with the adhesive to be tested is applied to the horizontal surface of a polyester, treated polyester or paper test substrate with at least 1.27 lineal dm in firm contact. Three passes in each direction with a 2 kg hard rubber roller are used to apply the strip. If air bubbles are entrapped between the test substrate and the test strip, the sample is discarded. The free end of the coated strip is doubled back nearly touching itself so the angle of removal will be 180°. The free end is attached to an adhesion tester scale. The polyester or paper test substrate is clamped in the jaws of a tensile testing machine which is capable of moving the substrate away from the scale at a constant rate of 2.3 meters per minute. The dwell time after roll down is 30 seconds. The scale reading in Newtons is recorded as the tape is peeled from the glass surface.

ABBREVIATIONS AND TRADENAMES

AA—acrylic acid
ABP—4-acryloyl-oxybenzophenone
BA—n-butyl acrylate
ECA—eicosanyl acrylate
HCA—hexacosanyl acrylate
HDDA—1,6-hexanediol diacrylate
IOA—isooctyl acrylate
ITDA—isotridecyl acrylate
LA—lauryl acrylate
LMA—lauryl methacrylate
ODA—octadecyl acrylate
OAcM—n-octyl acrylate
ODMA—octadecyl methacrylate
SIL—methacryloxypropyltrimethoxysilane sold under trade name Silane A-174 by Union Carbide
VAZO™ 64—2,2'-azobis(isobutyronitrile), available from DuPont The percentages in this specification and appended claims are all percentages by weight unless otherwise noted.

EXAMPLE 1

In a 500 ml four-necked reaction vessel, equipped with a stirrer, thermometer, condenser, addition funnel and thermowatch, 84.0 grams of IOA, 75 grams of ODA (@ 48% solids in ethyl acetate), 121 grams of ethyl acetate, and 0.92 gram of ABP (@ 26% solids in ethyl acetate) were charged. A solution of 0.36 gram VAZO™ 64 in 20 grams of ethyl acetate was added to the addition funnel. Both the solution in the reaction vessel and the materials in the addition funnel were then purged with argon (or nitrogen). The solution in the reaction vessel was then heated to 55° C. and initiator was added. After about 20 hours, a 98–99% conversion was obtained. The mixture was then coated from solution onto light weight, unprimed paper. No bleeding of the adhesive solution through the paper was observed. An oven dried coating thickness of 0.5 to 1.0 mil of the adhesive solution was obtained. The coating was passed three times under UV light (PPG UV processor equipped with medium pressure mercury lamps at 30 Watts/2.5 cm) at 25 meters/min.

The coated paper was then adhered, as specified in the above removability test, to two different test substrates: one being an 100 mm thick untreated poly(ethylene terephthalate) sheet ("PET", commercially available as PP2410 from Minnesota Mining and Manufacturing Company) the second being a 100 mm thick sheet of poly(ethylene terephthalate) film surface treated with hydrolyzed cellulose acetate ("treated PET", commercially available as G3120 from Minnesota Mining and Manufacturing Company). Removability was then measured for samples from both test substrates after dwell of one day and one week.

The test results were reported in Table 1.

TABLE 1

| | | REMOVABILITY | | | |
|---|---|---|---|---|---|
| Com- | Wt. % | PET | | treated PET | |
| position | ratio | 1 day | 1 week | 1 day | 1-week |
| IOA/ODA/ABP | 70/30/0.2 | good | good | good | good |

COMPARATIVE EXAMPLES C-1, C-2 and C-3

Examples C-1, C-2 and C-3 were prepared according to the procedure of Example 1. However, the examples were not prepared with a linear or branched higher alkyl acrylate or methacrylate. The removabilities of these compositions are reported in Table 2.

TABLE 2

| | | | REMOVABILITY | | | |
|---|---|---|---|---|---|---|
| | Com- | Wt. % | PET | | treated PET | |
| Ex. | position | ratio | 1 day | 1 week | 1 day | 1 week |
| C-1 | IOA/OA/ABP | 70/30/0.2 | aggress | aggress | aggress | aggress |
| C-2 | IOA/OAcM/ABP | 70/30/0.2 | raspy | tear | tear | tear |
| C-3 | IOA/EA/ABP | 70/30/0.2 | aggress | aggress | aggress | aggress |

The examples illustrate the need for the inclusion of at least one linear or branched higher alkyl acrylate or methacrylate in the removable adhesive composition of the present invention.

EXAMPLES 2–5

Examples 2–5 were prepared according to the procedure outlined in Example 1. Their removabilities are recorded in Table 3.

TABLE 3

| Ex. | Composition | Wt. % ratio | REMOVABILITY PET 1 day | 1 week | treated PET 1 day | 1 week |
|---|---|---|---|---|---|---|
| 2 | IOA/ODA/ABP | 90/10/0.2 | good | good | good | good |
| 3 | IOA/ODA/ABP | 80/20/0.2 | good | good | good | good |
| 4 | IOA/ODA/ABP | 60/40/0.2 | good | good | good | good |
| 5 | IOA/ODA/ABP | 50/50/0.2 | good | good | good | good |

Examples 2–5 illustrate the compositional range at which IOA/ODA adhesives retain their removability from both test substrates.

COMPARATIVE EXAMPLES C-4 AND C-5

Comparative Examples C-4 and C-5 were prepared in accordance with Example 1. These two comparative examples were prepared with higher alkyl acrylate compositions in excess of the ranges of the adhesive of the present invention.

TABLE 4

| Ex. | Composition | Wt. % ratio | REMOVABILITY PET 1 day | 1 week | treated PET 1 day | 1 week |
|---|---|---|---|---|---|---|
| C-4 | IOA/ODA/ABP | 40/60/0.2 | tear | tear | tear | tear |
| C-5 | IOA/LA/ABP | 30/70/0.2 | weak | weak | weak | weak |

As can be seen, Comparative Examples C-4 had too much adhesion causing substrate tear and C-5 exhibited virtually no adhesion.

EXAMPLES 6–15

Examples 6–15 were prepared in accordance with the procedure of Example 1. However, different higher alkyl acrylates and methacrylates were used. The results of the tests are reported in Table 5.

TABLE 5

| Ex. | Composition | Wt. % ratio | REMOVABILITY PET 1 day | 1 week | treated PET 1 day | 1 week |
|---|---|---|---|---|---|---|
| 6 | IOA/LMA/ABP | 90/10/0.2 | good | good | good | good |
| 7 | IOA/LMA/ABP | 80/20/0.2 | good | good | good | good |
| 8 | IOA/LMA/ABP | 50/50/0.2 | good | good | good | good |
| 9 | IOA/ODMA/ABP | 90/10/0.2 | good | good | good | good |
| 10 | IOA/ODMA/ABP | 70/30/0.2 | good | good | good | good |
| 11 | IOA/ODMA/ABP | 90/10/0.2 | good | good | good | good |
| 12 | IOA/TDA/ABP | 70/30/0.2 | good | good | good | good |
| 13 | IOA/ECA/ABP | 70/30/0.3 | good | good | good | good |
| 14 | IOA/HCA/ABP | 70/30/0.3 | good | good | good | good |
| 15 | IOA/TDA/ABP | 60/40/0.2 | good | good | good | good |

Examples 6–15 illustrate that compositional range varying higher alkyl acrylates and methacrylates at which the adhesives retain their removability from both test substrates.

EXAMPLES 16–20

Examples 16–20 were prepared in accordance with the procedure of Example 1. However, butyl acrylate was used instead of isooctyl acrylate. In addition, a number of different weight ratios of butyl acrylate were used. Test results are shown in Table 6.

TABLE 6

| Ex. | Composition | Wt. % ratio | REMOVABILITY PET 1 day | 1 week | treated PET 1 day | 1 week |
|---|---|---|---|---|---|---|
| 16 | BA/ODA/ABP | 90/10/0.2 | good | good | good | good |
| 17 | BA/ODA/ABP | 80/20/0.2 | good | good | good | good |
| 18 | BA/ODA/ABP | 70/30/0.2 | good | good | good | good |
| 19 | BA/ODA/ABP | 60/40/0.2 | good | good | good | good |
| 20 | BA/ODA/ABP | 50/50/0.2 | good | good | good | good |

Examples 16–20 illustrate that compositional range of butyl acrylates at which the adhesives retain their removability from both test substrates.

COMPARATIVE EXAMPLES C-7 AND C-8

Comparative Examples C-7 and C-8 were made in accordance with the procedure of Example 16. These two comparative examples were prepared with higher alkyl acrylate compositions in excess of the ranges of the adhesive of the present invention. Test results are reported in Table 7.

TABLE 7

| Com- | Wt. % | REMOVABILITY PET | treated PET |
|---|---|---|---|

| Ex. | position | ratio | 1 day | 1 week | 1 day | 1 week |
|---|---|---|---|---|---|---|
| C-6 | BA/ODA/ABP | 40/60/0.2 | shocky | tear | tear | tear |
| C-7 | BA/ODA/ABP | 30/70/0.2 | weak | weak | weak | weak |

As can be seen, Comparative Examples C-6 had too much adhesion and C-7 exhibited virtually no adhesion at all.

EXAMPLE 21

This example demonstrates the preparation and removability of a hot melt processable adhesive of this invention.

In a 500 ml four-necked reaction vessel, equipped with a stirrer, thermometer, condensor and thermowatch, 84.0 grams of IOA, 75 grams of ODA (@ 48% solids in ethyl acetate), 121 grams of ethyl acetate, and 0.92 gram of ABP (@ 26% solids in ethyl acetate), and solution of 0.36 gram VAZO™ 64 in 20 grams of ethyl acetate were charged. The solution in the reaction vessel was then purged with nitrogen to create an inert atmosphere. The solution in the reaction vessel was then heated to 55° C. for 20 hours. A 98–99% conversion was obtained. The mixture was then coated from solution onto a siliconized release liner and oven dried at 65° C. for 15 minutes. The solid polymer was then removed from the liner and placed into a small piston coater. The solid polymer was then heated to 145°–170° C. and coated onto a roll of 30 pound machine-glazed bond paper stock. The coating was passed three times under UV light (PPG UV processor equipped with medium pressure mercury lamps at 30 Watts/2.5 cm) at 25 meters/min. A coating thickness of 0.4 to 1.0 mil of the hot melt adhesive was obtained.

The coated paper was then adhered, as specified in the above removability test, to two different test substrates: one being an 100 mm thick untreated poly(ethylene terephthalate) sheet ("PET", commercially available as PP2410 from Minnesota Mining and Manufacturing Company) the second being a 100 mm thick sheet of poly(ethylene terephthalate) film surface treated with hydrolyzed cellulose acetate ("treated PET", commercially available as G3120 from Minnesota Mining and Manufacturing Company). Removability was then measured for samples from both test substrates after dwell of one day and one week.

TABLE 8

| | | | REMOVABILITY | | | |
|---|---|---|---|---|---|---|
| | Com- | Wt. % | PET | | treated PET | |
| Ex. | position | ratio | 1 day | 1 week | 1 day | 1 week |
| 21 | IOA/ODA/ABP | 70/30/0.2 | good | good | good | good |

EXAMPLES 22–27

Examples 22–27 were made in accordance with Example 21. Compositions and weight ratios of the compositions are reported in Table 9.

TABLE 9

| | | | REMOVABILITY | | | |
|---|---|---|---|---|---|---|
| | Com- | Wt. % | PET | | treated PET | |
| Ex. | position | ratio | 1 day | 1 week | 1 day | 1 week |
| 22 | IOA/ODA/ABP | 90/10/0.2 | good | good | good | good |
| 23 | IOA/ODA/ABP | 80/20/0.2 | good | good | good | good |
| 24 | IOA/ODA/ABP | 60/40/0.2 | good | good | tear | good |
| 25 | BA/ODA/ABP | 70/30/0.2 | good | good | good | good |
| 26 | BA/ODA/ABP | 60/40/0.2 | good | good | good | good |
| 27 | BA/ODA/ABP | 50/50/0.2 | good | good | good | good |

As can be seen, Examples 20–25 all exhibited good removability.

EXAMPLES 28–31

Examples 28–31 were prepared in accordance with the procedure of Example 21 with varying compositions and weight ranges. Examples 28–31 were tested for peel adhesion on a variety of substrates. Three different test substrates were used: one being a 100 mm thick untreated poly(ethylene terephthalate) sheet ("PET"), the second being a 100 mm thick sheet of poly(ethylene terephthalate) film surface treated with hydrolyzed cellulose acetate ("treated PET") and the third being copy paper. Peel adhesion was then measured for samples for all three test substrates. The test results are shown in Table 10.

TABLE 10

| | | Peel Adhesion (N/dm) | | | |
|---|---|---|---|---|---|
| Ex. | Composition | Wt. % | PET | PET TREATED | PAPER |
| 28 | IOA/ODA/ABP | 60/40/0.2 | 1.8 | 0.7 | 1.3 |
| 29 | BA/ODA/ABP | 70/30/0.2 | 9.2 | 9.2 | 10.5 |
| 30 | BA/ODA/ABP | 60/40/0.2 | 15.1 | 13.6 | 25.8 |
| 31 | BA/ODA/ABP | 50/50/0.2 | 7.4 | 8.3 | 6.8 |

As can be seen, Examples 28–31 exhibited suitable peel adhesion.

EXAMPLE 32

Example 32 was prepared in the same manner as Examples 28–31. However, two higher alkyl acrylates were used instead of one. The test results are shown in Table 11.

TABLE 11

| | Com- | Wt. % | PET | | treated PET | |
|---|---|---|---|---|---|---|
| Ex. | position | ratio | 1 day | 1 week | 1 day | 1 week |
| 32 | IOA/ODA/LMA/ABP | 70/20/10/0.2 | good | good | good | good |

As can be seen, Example 32 exhibited good removability.

EXAMPLES 33–34

Examples 33–34 were prepared in same manner as Example 1. However, the ratios of the crosslinker ABP were varied. Test results are recorded in Table 12.

TABLE 12

| | | | PEEL ADHESION | | |
|---|---|---|---|---|---|
| EX. | COMPOSITION | WT. % RATIO | PET | TREAT- ED PET | PAPER |
| 33 | IOA/ODA/ABP | 70/30/0.3 | 6.6 | 3.1 | 1.5 |
| 34 | IOA/ODA/ABP | 70/30/0.4 | 0.7 | 1.3 | 0.7 |

COMPARATIVE EXAMPLE 8-C

Comparative Example 8-C was made in the same manner as Example 1 without any crosslinker. The results are reported in Table 13.

TABLE 13

| | | | PEEL ADHESION | | |
|---|---|---|---|---|---|
| EX. | COMPOSITION | WT. % RATIO | PET | TREAT- ED PET | PAPER |
| 8-C | IOA/ODA/ABP | 70/30/0 | COHESIVE FAILURE | | |

EXAMPLES 35–38

Example 35 was prepared in the following manner: 0.1 gram of 2,2-dimethoxy-2-phenyl acetophenone sold under the tradename Escacure KB1 by Sartomer Company was dissolved in 100 grams of a 70/30 monomer mixture of isooctyl acrylate and octadecylacrylate. The mixture was purged with nitrogen and prepolymerized under a set of 40 Watt fluorescent UV lights resulting in a mixture having syrup-like consistency. Next, 0.18 grams of HDDA were added together with 0.1 grams of Escacure KB1 to the syrup-like mixture.

The mixture was then knife-coated onto a substrate and completely polymerized under a bank of fluorescent UV lights in an inert atmosphere. Three different test substrates were used: one being a 100 mm thick untreated poly(ethylene terephthalate) sheet ("PET"), the second being a 100 mm thick sheet of poly(ethylene terephthalate) film surface treated with hydrolyzed cellulose acetate ("treated PET") and the third being copy paper. Peel adhesion was then measured for samples for all three test substrates.

Examples 36–38 were prepared in the same manner as Example 35 except that the amount of HDDA and/or ODA was changed.

The compositions and weight ratios of Examples 34–37 are reported in Table 14 as are the results of the testing.

TABLE 14

| | | | PEEL ADHESION | | |
|---|---|---|---|---|---|
| EX. | COMPOSITION | WT. % RATIO | PET | TREAT- ED PET | PAPER |
| 35 | IOA/ODA/HDDA | 70/30/0.1 | 22.5 | 30.4 | 48.4 |
| 36 | IOA/ODA/HDDA | 70/30/0.2 | 17.5 | 20.4 | 24.7 |
| 37 | IOA/ODA/HDDA | 80/20/0.1 | 34.8 | 31.7 | 52.1 |
| 38 | IOA/ODA/HDDA | 80/20/0.2 | 20.6 | 24.3 | 30.2 |

EXAMPLES 39–41

Example 39 was prepared in the following manner: A 500 ml. three-necked reaction vessel, equipped with a stirrer, thermometer, thermowatch and condenser was charged with 84 grams of IOA, 75 grams of ODA (@48% solids in ethyl acetate), 121 grams of ethyl acetate and 0.2 grams of silane crosslinker sold under the tradename Silane A-174 by Union Carbide. Next, a solution of 0.36 grams of VAZO™ dissolved in 20 grams of ethyl acetate was added to the charge. Then the vessel was purged with nitrogen and heated to 55° C. for about 20 hours.

Prior to coating, about 0.04 grams of dibutyl tin dilaurate catalyst was mixed into the solution. The material was coated onto the substrate and dried in the oven. Three different test substrates were used: one being a 100 mm thick untreated poly(ethylene terephthalate) sheet ("PET"), the second being a 100 mm thick sheet of poly(ethylene terephthalate) film surface treated with hydrolyzed cellulose acetate ("treated PET") and the third being copy paper. Peel adhesion was then measured on all three test substrates.

Examples 40 and 41 were made in the same manner except the amount of SIL was varied as indicated in Table 15. The results of the testing are reported in Table 15.

TABLE 15

| | | | PEEL ADHESION (N/dm) | | |
|---|---|---|---|---|---|
| EX. | COMPOSITION | WT. % RATIO | PET | TREAT- ED PET | PAPER |
| 39 | IOA/ODA/SIL | 70/30/0.2 | 2.4 | 3.5 | 5.3 |
| 40 | IOA/ODA/SIL | 70/30/0.3 | 1.8 | 1.8 | 1.8 |
| 41 | IOA/ODA/SIL | 70/30/0.4 | 1.5 | 1.5 | 1.6 |

In summary, a novel and unobvious adhesive has been described having a low melt viscosity. Although specific embodiments and examples of the present invention have been described herein, it should be borne in mind that these are by way of explanation and illustration and the present invention is not limited thereby. Certainly modifications which are within the ordinary skill in the art are considered to lie within the scope of this invention as defined by the following claims including all equivalents.

We claim:

1. An acrylic pressure-sensitive adhesive comprising:
   a.) about 10 to about 50% by weight of at least one higher alkyl acrylate having an alkyl group which contains about 18 to about 26 carbon atoms;
   b.) about 90 to about 50% by weight of at least one lower alkyl acrylate having an alkyl group which contains about 4 to about 12 carbon atoms; and
   c.) a crosslinking agent present in an amount sufficient such that, when polymerized and cured, the adhesive composition is tacky at room temperature.

2. The adhesive of claim 1 wherein the higher alkyl acrylate is selected form the group consisting of alkyl acrylates having alkyl groups containing 18 carbon atoms and alkyl acrylates having alkyl groups containing 22 carbon atoms.

3. The adhesive of claim 1 wherein the crosslinker is selected from the group consisting of a multifunctional acrylate, a multifunctional methacrylate, a chromophore-substituted halomethyl-s-triazine, a benzophenone, an acetophenone, a silane, a mono-ethylenically unsaturated aromatic ketone, and combinations thereof.

4. The adhesive of claim 1 wherein the crosslinker comprises from about 0.05 to about 1.0% by weight of the adhesive.

5. The adhesive of claim 1 wherein the adhesive comprises from about 30 to about 50% by weight of the higher alkyl acrylate, from about 50 to about 70% by weight of the lower alkyl acrylate, and from about 0.1 to about 0.5% by weight of said crosslinker.

6. An adhesive coated sheet material bearing an adhesive composition on a portion of at least one major surface, the adhesive composition comprising:
   a.) about 10 to about 50% by weight of at least one higher alkyl acrylate having an alkyl group which contains about 18 to about 26 carbon atoms;
   b.) about 90 to about 50% by weight of at least one lower alkyl acrylate having an alkyl group which contains about 4 to about 12 carbon atoms; and
   c.) a crosslinking agent present in an amount sufficient such that, when polymerized and cured, the adhesive composition [has sufficient peel adhesion to adhere to a contact surface, and sufficient removability to allow the adhesive to be removed from the contact surface without substantially damaging or leaving residue on the contact surface] is tacky at room temperature.

7. The adhesive coated sheet material of claim 6 wherein the higher alkyl acrylate is selected form the group consisting of alkyl acrylates having alkyl groups containing 18 carbon atoms and alkyl acrylates having alkyl groups containing 22 carbon atoms.

8. The adhesive coated sheet of claim 6 wherein the crosslinker is selected from the group consisting of a multifunctional acrylate, a multifunctional methacrylate, a chromophore-substituted halomethyl-s-triazine, a benzophenone, an acetophenone, a silane, a mono-ethylenically unsaturated aromatic ketone, and combinations thereof.

9. The adhesive coated sheet of claim 6 wherein the crosslinker comprises from about 0.05 to about 1.0% by weight of the adhesive.

10. The adhesive coated sheet of claim 6 wherein the adhesive comprises from about 30 to about 50% by weight of the higher alkyl acrylate, from about 50 to about 70% by weight of the lower alkyl acrylate, and from about 0.1 to about 0.5% by weight of said crosslinker.

11. A method of making a pressure-sensitive adhesive coated sheet material comprising the following steps:
   a. polymerizing an adhesive mixture comprising a) about 10 to about 50 % by weight of at least one higher alkyl acrylate having an alkyl group which contains about 18 to about 26 carbon atoms; and b) about 90 to about 50% by weight of at least one lower alkyl acrylate having an alkyl group which contains about 4 to about 12 carbon atoms;
   b. adding a crosslinking agent to the adhesive mixture;
   c. coating the adhesive onto the sheet material;
   d. drying the adhesive; and
   e. curing the adhesive.

12. The method of claim 11 wherein the higher alkyl acrylate is selected form the group consisting of alkyl acrylates having alkyl groups containing 18 carbon atoms and alkyl acrylates having alkyl groups containing 22 carbon atoms.

13. The method of claim 11 wherein the crosslinking agent is added to the adhesive mixture prior to polymerizing the adhesive mixture.

14. The method of claim 13 wherein the polymerization is carried out by exposing the mixture to ultraviolet light.

15. The method of claim 11 wherein the polymerization is carried out by exposing the mixture to ultraviolet light.

16. The method of claim 11 wherein the curing step is carried out by exposing the adhesive to ultraviolet light.

17. The method of claim 11 wherein the curing step is carried out by exposing the adhesive to moisture.

18. The method of claim 11 wherein the crosslinker is selected from the group consisting of a multifunctional acrylate, a multifunctional methacrylate, a chromophore-substituted halomethyl-s-triazine, a benzophenone, an acetophenone, a silane, a mono-ethylenically unsaturated aromatic ketone, and combinations thereof.

19. The method of claim 11 wherein the crosslinker comprises from about 0.05 to about 1.0% by weight of the adhesive.

20. The method of claim 11 wherein the adhesive comprises from about 30 to about 50% by weight of the higher alkyl acrylate, from about 50 to about 70% by weight of the lower alkyl acrylate, and from about 0.1 to about 0.5% by weight of said crosslinker.

* * * * *

UNITED STATES PATENT AND TRADEMARK OFFICE
CERTIFICATE OF CORRECTION

PATENT NO.: 5,552,451

DATED: September 3, 1996

INVENTOR(S): Albert I. Everaerts et al.

It is certified that error appears in the above-identified patent and that said Letters Patent is hereby corrected as shown below:

Col. 1, line 5, "Ser. No. 08/218/841" should be -- Ser. No. 08/218,841 --.

Col. 15, lines 18-22, delete "[has sufficient peel adhesion to adhere to a contact surface, and sufficient removability to allow the adhesive to be removed from the contact surface without substantially damaging or leaving residue on the contact surface]".

Col. 15, line 24, "selected form" should read -- selected from --.

Col. 16, line 13, "selected form" should read -- selected from --.

Signed and Sealed this

Twenty-eighth Day of April, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,552,451
DATED        : September 3, 1996
INVENTOR(S)  : Albert I. Everaerts, Jeffrey D. Malmer It is certified that error appears in the above-identified patent and that said Letters Patent is hereby corrected as shown below:

Column 1,
Line 5, "Ser. No. 08/218/841" should be -- Ser. No. 08/218,841 --.

Column 15,
Lines 17-21, the following should be deleted [has sufficient peel adhesion to adhere to a contact surface, and sufficient removability to allow the adhesive to be removed from the contact surface without substantially damaging or leaving residue on the contact surface].
Lines 18-22, delete "[has sufficient peel adhesion to adhere to a contact surface, and sufficient removability to allow the adhesive to be removed from the contact surface without substantially damaging or leaving residue on the contact surface]".
Line 24, "selected form" should read -- selected from --.

Column 16,
Line 13, "selected form" should read -- selected from --.

Signed and Sealed this

Twentieth Day of November, 2001

*Attest:*

*Attesting Officer*

NICHOLAS P. GODICI
*Acting Director of the United States Patent and Trademark Office*